United States Patent
Bourouiba et al.

(10) Patent No.: US 12,551,670 B2
(45) Date of Patent: Feb. 17, 2026

(54) CEREBROSPINAL FLUID SPACE DRAINING CATHETERS

(71) Applicant: Massachusetts Institute of Technology, Cambridge, MA (US)

(72) Inventors: Lydia Bourouiba, Cambridge, MA (US); Sungkwon Lee, Cambridge, MA (US); Thomas Heldt, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 944 days.

(21) Appl. No.: 17/778,268

(22) PCT Filed: Nov. 18, 2020

(86) PCT No.: PCT/US2020/060950
§ 371 (c)(1),
(2) Date: May 19, 2022

(87) PCT Pub. No.: WO2021/101928
PCT Pub. Date: May 27, 2021

(65) Prior Publication Data
US 2023/0001165 A1    Jan. 5, 2023

Related U.S. Application Data

(60) Provisional application No. 62/937,975, filed on Nov. 20, 2019.

(51) Int. Cl.
*A61M 27/00* (2006.01)
*A61M 25/00* (2006.01)

(52) U.S. Cl.
CPC ........ *A61M 27/006* (2013.01); *A61M 25/007* (2013.01)

(58) Field of Classification Search
CPC .............. A61M 27/006; A61M 25/007; A61M 25/0015; A61M 25/0017; A61M 2025/0019
See application file for complete search history.

(56) References Cited

U.S. PATENT DOCUMENTS 5,125,913 A * 6/1992 Quackenbush ..... A61M 25/001
138/140
5,431,637 A * 7/1995 Okada ................... A61M 1/84
604/540

(Continued)

FOREIGN PATENT DOCUMENTS

WO    WO-2015132435 A1 *  9/2015 .......... A61M 27/006

OTHER PUBLICATIONS

International Search Report and Written Opinion mailed Feb. 21, 2021, for Application No. PCT/US2020/060950.

(Continued)

*Primary Examiner* — Adam Marcetich
(74) *Attorney, Agent, or Firm* — Wolf, Greenfield & Sacks, P.C.

(57) ABSTRACT

Ventricular catheters and their methods of use are disclosed. In some embodiments, the disclosed ventricular catheters may reduce, or substantially prevent, obstruction of the catheter by astrocytes or other brain tissue due to adhesion and/or growth within the catheter. For example, in some embodiments, the holes and internal lumen of a ventricular catheter may be constructed such that the wall shear stresses applied within the holes and internal lumen of the catheter are greater than a threshold shear stress to prevent cell adhesion and growth within the catheter.

25 Claims, 4 Drawing Sheets

(56) References Cited

U.S. PATENT DOCUMENTS

| | | | | |
|---|---|---|---|---|
| 5,462,521 | A * | 10/1995 | Brucker | A61M 25/0069 604/20 |
| 5,514,108 | A * | 5/1996 | Stevens | A61M 25/008 604/525 |
| 5,662,619 | A * | 9/1997 | Zarate | A61M 1/3661 604/246 |
| 6,117,125 | A * | 9/2000 | Rothbarth | A61M 25/007 604/523 |
| 6,132,405 | A * | 10/2000 | Nilsson | A61M 1/285 604/29 |
| 6,533,763 | B1 * | 3/2003 | Schneiter | A61M 25/007 604/523 |
| 7,037,288 | B2 | 5/2006 | Rosenberg et al. | |
| 7,699,800 | B2 | 4/2010 | Dextradeur et al. | |
| 8,221,392 | B2 | 7/2012 | Dextradeur et al. | |
| 8,827,944 | B2 | 9/2014 | Sevrain | |
| 9,694,166 | B2 | 7/2017 | Hurt | |
| 10,232,151 | B2 | 3/2019 | Wilson et al. | |
| 2002/0165486 | A1 * | 11/2002 | Bertolero | A61B 90/36 606/192 |
| 2005/0038406 | A1 * | 2/2005 | Epstein | A61M 25/00 604/93.01 |
| 2006/0074388 | A1 | 4/2006 | Dextradeur et al. | |
| 2006/0253101 | A1 * | 11/2006 | Hartlep | A61M 25/007 604/523 |
| 2008/0249522 | A1 * | 10/2008 | Pappone | A61M 25/007 606/41 |
| 2009/0030400 | A1 * | 1/2009 | Bose | A61M 25/0023 604/528 |
| 2010/0204634 | A1 | 8/2010 | Baxter et al. | |
| 2010/0324503 | A1 * | 12/2010 | McKinnon | A61M 25/0009 604/246 |
| 2011/0028939 | A1 * | 2/2011 | Yarger | A61M 1/84 604/523 |
| 2011/0130745 | A1 | 6/2011 | Shevgoor et al. | |
| 2011/0282264 | A1 * | 11/2011 | Hurt | A61M 27/006 604/9 |
| 2012/0041394 | A1 * | 2/2012 | Haider | A61M 25/0068 604/272 |
| 2013/0281985 | A1 * | 10/2013 | Querol Garcia | A61M 25/0032 604/540 |
| 2014/0207107 | A1 * | 7/2014 | Dib | A61M 25/0023 604/509 |
| 2014/0230854 | A1 * | 8/2014 | Lopez | A61M 25/0017 15/104.03 |
| 2015/0088090 | A1 * | 3/2015 | Macy, Jr. | A61M 1/83 604/266 |
| 2015/0368619 | A1 * | 12/2015 | Kim | C12M 47/04 435/379 |
| 2016/0136389 | A1 * | 5/2016 | Christian | A61M 25/0043 604/523 |
| 2016/0331927 | A1 | 11/2016 | Richardson et al. | |
| 2017/0333685 | A1 | 11/2017 | Kassab et al. | |
| 2021/0177430 | A1 * | 6/2021 | Tal | A61M 25/0051 |

OTHER PUBLICATIONS

International Preliminary Report on Patentability mailed Jun. 2, 2022, for Application No. PCT/US2020/060950.

[No Author Listed], Medtronic Neurosurgery Product Catalog. Nov. 2016. 230 pages.

Galarza et al., Computational fluid dynamics of ventricular catheters used for the treatment of hydrocephalus: a 3D analysis. Childs Nerv Syst. Jan. 2014;30(1): 105-16. doi: 10.1007/s00381-013-2226-1. Epub Jul. 24, 2013.

Hanak et al., Toward a better understanding of the cellular basis for cerebrospinal fluid shunt obstruction: report on the construction of a bank of explanted hydrocephalus devices. J Neurosurg Pediatr. Aug. 2016;18(2):213-23. doi: 10.3171/2016.2.PEDS15531. Epub Apr. 1, 2016.

Harris et al., Fabrication of three-dimensional hydrogel scaffolds for modeling shunt failure by tissue obstruction in hydrocephalus. Fluids Barriers CNS. Nov. 14, 2015;12:26.

Lee et al., Enhanced wall shear stress prevents obstruction by astrocytes in ventricular catheters. J R Soc Interface. Jul. 2020;17(168):20190884. doi: 10.1098/rsif.2019.0884. Epub Jul. 1, 2020.

Lee, Flow optimization of ventricular catheters for shear stress-induced death of astrocytes. Master's thesis. Massachusetts Institute of Technology. Sep. 2019. 88 pages.

Lin et al., Computational and experimental study of proximal flow in ventricular catheters. Technical note. J Neurosurg. Aug. 2003;99(2):426-31.

Sarkiss et al., Time dependent pattern of cellular characteristics causing ventriculoperitoneal shunt failure in children. Clin Neurol Neurosurg. Dec. 2014;127:30-2. doi: 10.1016/j.clineuro.2014.09.029. Epub Oct. 5, 2014.

Weisenberg et al., Ventricular catheter development: past, present, and future. J Neurosurg. Dec. 2016;125(6):1504-1512. doi: 10.3171/2015.12.JNS151181. Epub Mar. 4, 2016.

* cited by examiner

CEREBROSPINAL FLUID SPACE DRAINING CATHETERS

RELATED APPLICATIONS

This application is a national stage filing under 35 U.S.C. § 371 of International application serial number PCT/US2020/060950, filed Nov. 18, 2020, which claims priority under 35 U.S.C. 119(e) to U.S. provisional application Ser. No. 62/937,975, filed Nov. 20, 2019, the disclosure of each of which is incorporated herein by reference in its entirety for all purposes.

FIELD

Disclosed embodiments are related to cerebrospinal fluid space draining catheters.

BACKGROUND

Hydrocephalus is a disease identified by enlarged cerebral ventricles due to excessive cerebrospinal fluid (CSF) accumulation in the brain's ventricular system. If left untreated, hydrocephalus leads to severe morbidity and premature death. The most widely used treatment option is catheter-based shunting of excess cerebrospinal fluid from one of the brain's ventricular spaces to the abdominal cavity or cardiovascular system. While this approach has been widely used to treat the disease, the catheter has a low lifespan due to obstruction by brain tissue, burdening patients with recurrent invasive brain surgeries to replace obstructed catheters.

SUMMARY

In one embodiment, a catheter includes a tube, and a plurality of holes disposed along a length of the tube and extending from an exterior surface to an internal lumen of the tube. The plurality of holes and the internal lumen of the tube are configured such that a wall shear stress of the plurality of holes and the internal lumen due to cerebrospinal fluid flowing through the catheter with a predetermined flow rate is greater than a threshold shear stress to prevent cell adhesion and growth within the catheter.

In another embodiment, a method for draining cerebrospinal fluid from a cerebrospinsal fluid space of a brain of a subject includes: inserting a catheter into a location fluidly connected to the cerebrospinal fluid space of the brain, wherein the catheter comprises a tube and a plurality of holes disposed along a length of the tube and extending from an exterior surface to an internal lumen of the tube; and draining the cerebrospinal fluid from the ventricular space through the ventricular catheter, wherein draining the cerebrospinal fluid through the ventricular catheter applies wall shear stresses to the plurality of holes and the internal lumen that is greater than a threshold shear stress to prevent cell adhesion and growth within the catheter.

In yet another embodiment, a catheter includes a tube, and a plurality of holes disposed along a length of the tube and extending from an exterior surface to an internal lumen of the tube. Each hole has a hole transverse dimension and a hole depth. At least one hole of the plurality of holes has a first depth that is different from a second depth of at least one of the remaining plurality of holes.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
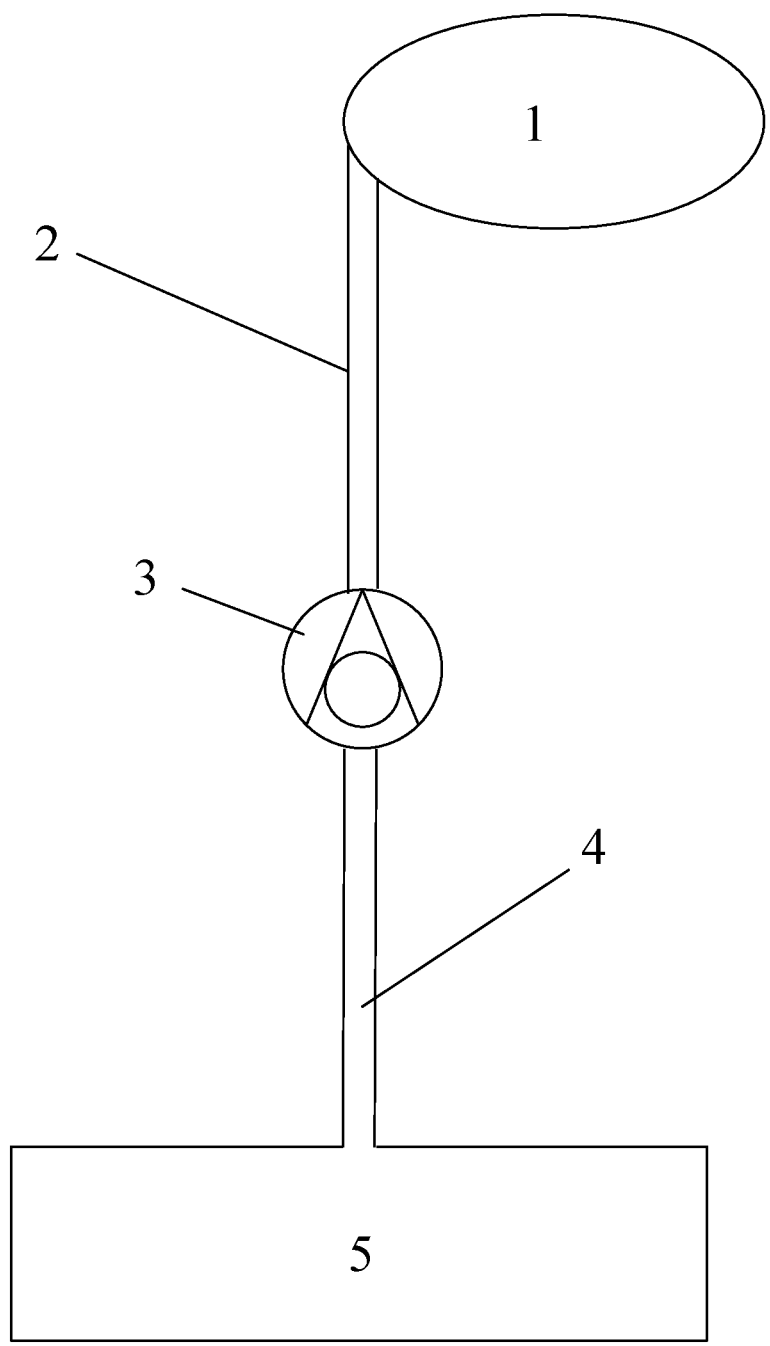
FIG. 1 is a schematic view of an apparatus including a ventricular catheter for treating hydrocephalus.

As noted above, hydrocephalus is a disease identified by enlarged ventricles due to excessive cerebrospinal fluid (CSF) accumulation in the ventricular system. The preferred method for treating hydrocephalus includes a catheter-based shunting device to drain the excess cerebrospinal fluid into the abdominal cavity or and/cardiovascular system. Although this type of treatment has been used for more than 60 years, the design still suffers from a low lifespan, particularly due to obstruction occurring in the ventricular catheter of a system. Shunt obstructions can cause headaches, vomiting, drowsiness, papilledema, thoracic back pain, neck stiffness, blindness and even death. Thus, when obstruction of a catheter occurs, the shunt is replaced. However, the shunt is replaced during an additional invasive brain surgery, which can result in a serious brain hemorrhage and infection, endangering a patient's life.

While ventricular catheters, and other catheters placed in fluid communication with the cerebrospinal fluid space, may be obstructed by a number of different tissues, choroid plexus and glial tissue, which includes astrocytes, are the major causes for the obstruction of ventricular catheters. Further, while investigating the response of astrocytes under fluid shear stress in vitro, the inventors found that fluid shear stress was capable of mitigating the growth of astrocytes. Accordingly, the Inventors have recognized the benefits associated with a ventricular catheter designed such that a wall shear stress inside the ventricular catheter during flow is enhanced so that the adhesion and/or ingrowth of astrocytes and/or other types of tissue within the ventricular catheter is reduced and/or substantially eliminated. Specifically, in some embodiments, the construction of a ventricular catheter may be optimized such that a wall shear stress within the holes and internal lumen of the catheter under a predetermined flow rate through the catheter may be greater than a predetermined threshold shear stress that is selected to prevent the adhesion and/or growth of tissue within the catheter. Thus, the disclosed systems may provide wall shear stresses on the inner surfaces of the catheter that are sufficiently high to reduce, or substantially prevent, obstructions forming in a ventricular catheter during use.

Based on the above, the Inventors have recognized that prior systems have focused on preventing obstruction by large tissue such as choroid plexus, rather than astrocytes. Thus, to hinder the entrapment of large tissue, such as choroid plexus (blood vessels in the brain), prior catheter designs sought to homogenize flow rates across the holes of a catheter by controlling the hole geometries to provide uniform volumetric flow across the catheter's length. However, this approach would not result in the attenuation of glial tissue infiltration, as the approach does not consider wall shear stress control. Instead, tissue infiltration, adhesion, and growth within a ventricular catheter may be reduced by manipulating geometric parameters of a ventricular catheter to achieve sufficiently enhanced wall shear stresses along the surfaces of the holes and internal lumen of the catheter. For example, design parameters that may be used to control the wall shear stress within a catheter may include, but are not limited to, appropriate combinations of hole spacing, hole depth, hole transverse dimension, internal lumen transverse dimension, exterior surface transverse dimension, and others. It should be appreciated that geometric parameters other than those noted above may be used to provide a minimum threshold wall shear stress along the length of a catheter.

In view of the above, in some embodiments, a catheter may include a tube with a plurality of holes disposed along at least a portion of a length of the tube. The holes may extend from an exterior surface to an internal lumen of the tube such that the surrounding environment is fluidly connected to the internal lumen of the tube through the holes. A fluid, such as cerebrospinal fluid, flowing from the surrounding environment, through the holes, into the internal lumen, and out of a distal end of the catheter may result in a wall shear stress being applied to the various interior surfaces of the holes and internal lumen. The fluid may flow through the catheter with an average predetermined flow rate. Further, the holes and internal lumen of the tube may be configured using appropriate parameters such as hole depth, hole transverse dimension, internal lumen transverse dimension, lumen length, and/or other appropriate parameters to provide a minimum wall shear stress along the interior surfaces of the holes and internal lumen when the fluid flows through the catheter at the average predetermined flow rate. As noted above, this minimum wall shear stress may be greater than a threshold shear stress to reduce, or substantially prevent, the adhesion and/or growth of brain cells, such as astrocytes, within the catheter.

In view of the above, the various parameters of a catheter design including hole and internal lumen dimensions, as well as the overall hole arrangement along a catheter, may be balanced to provide a desired minimum threshold wall shear stress under a predetermined average flow of cerebrospinal fluid through the catheter. For example, parameters that may be considered include: a ratio between a hole transverse dimension (e.g. diameter) to a lumen transverse dimension; the ratio between a hole depth and a spacing interval between adjacent holes; and/or any other appropriate ratio or parameter. Specifically, and without wishing to be bound by theory, as the ratio of a hole transverse dimension to a lumen transverse dimension decreases, the relative wall shear stress within the overall system may increase. Additionally, without wishing to be bound by theory, as the ratio of a hole depth to a spacing interval between holes increases, the overall average wall shear stress within the holes and lumen may also be increased. Thus, by balancing the depth, transverse dimensions, spacing, and/or length using the above concepts and/or other appropriate design parameters, an overall catheter design may be optimized to provide a desired minimum wall shear stress that is greater than a threshold wall shear stress along a length of the catheter in both the holes and internal lumen of the catheter. Again, this may help to reduce, or substantially prevent, brain tissue cells, such as astrocytes, from forming obstructions in the catheter.

In typical ventricular catheters, a constant hole depth is used along a length of the catheter and the hole diameters are varied to provide a uniform flow of fluid into the holes along a length of the catheter. However, as elaborated on below, such a construction results in very large uncontrolled variations in wall shear stress along a length of the catheter. Thus, in some embodiments, at least one hole of the plurality of holes located along a length of a catheter may have a depth that is different from a depth of the remaining holes. Further, in some of the embodiments, the plurality of holes may exhibit a plurality of different depths depending on the particular design. These differences in depths of the holes along a length of the catheter may be balanced with the transverse dimensions of the associated holes and/or other design parameters to provide a desired wall shear stress within each hole that is greater than a predetermined threshold shear stress as noted above. Further, in some embodiments, a depth of the holes may vary sequentially along the length of the catheter such that multiple holes, and in certain embodiments all of the holes, exhibit different depths that vary sequentially along a length of the catheter. In such an embodiment, sequentially located holes may show sequential changes in hole depth. Though instances where sequential portions of a catheter may show changes in hole depth are also contemplated. For example, a first set of holes located within a first portion of the catheter may have a first depth and a second set of holes located within a second portion of the catheter may have a second depth that is different from the first depth. In either case, the resulting catheters may exhibit flow that has been optimized to provide a desired wall shear stress behavior during operation as compared to providing just a uniform flow through the holes as is typical in other ventricular catheters. However, embodiments in which the hole transverse dimensions, and other parameters, are balanced to provide both the desired minimum wall shear stress as well as substantially uniform flow through adjacent holes are also contemplated.

As noted above, the hole depths may vary along a length of a catheter, in combination with other appropriate parameters, to provide a desired wall shear stress within the holes of a catheter and internal lumen. Accordingly, it should be understood that the differences in hole depths may be provided in any appropriate manner. For example, in one embodiment, a hole depth along a length of the catheter may be provided by modifying a transverse dimension of the internal lumen relative to a constant transverse dimension of the catheter's outer surface. Specifically, by increasing or decreasing the transverse dimension of one or more portions of the internal lumen relative to the transverse dimension of the outer surface, a hole depth may be controlled. The hole depth may also be controlled by increasing or decreasing the transverse dimension of one or more portions of an exterior surface of a catheter relative to a constant transverse dimension of the catheter internal lumen. Of course, embodiments in which hole depths along a length of a catheter are controlled using one or both of these strategies are contemplated as the disclosure is not limited to how the depths of the holes are provided.

Using the various embodiments of a catheter described herein, cerebrospinal fluid may be drained from a ventricular space of a brain by inserting a catheter into a location fluidly connected to the ventricular space of a subject's brain including, for example, direct implantation in the ventricular space, implantation into locations connected to the ventricular space such as a cisternal spaces, and/or any other appropriate location within a subject's cerebrospinal fluid space. As noted above, the catheter may include a tube with a plurality of holes disposed along a length and extending from an exterior surface to an internal lumen of a tube of the catheter. Cerebrospinal fluid may be drained from the ventricular space through the catheter resulting in flow through the holes and internal lumen of the catheter. The plurality of holes and the internal lumen of the tube may be configured such that a wall shear stress applied to the interior surfaces of the holes and the internal lumen during flow of the cerebrospinal fluid through the catheter is greater than a threshold shear stress to prevent cell adhesion and/or growth of tissue within the catheter.

In the various embodiments described herein, a threshold wall shear stress can correspond to any appropriate range of threshold wall shear stresses that is appropriate to reduce and/or substantially prevent the adhesion and/or growth of tissue within a catheter. For example, in some embodiments, a threshold wall shear stress within the various portions of a ventricular catheter under a predetermined flow rate may be greater than or equal to 1.0 mPa, 2.0 mPa, 5.0 mPa, and/or any other appropriate threshold wall shear stress. Correspondingly, the threshold wall shear stress may be less than or equal to 10.0 mPa, 7.5 mPa, 5.0 mPa, and/or any other appropriate threshold wall shear stress. Combinations of the foregoing are contemplated, including a threshold wall shear stress that is between or equal to 1.0 mPa and 10.0 mPa. However, it should be understood that threshold wall shear stresses both greater than and less than those noted above may also be used in certain embodiments as the disclosure is not so limited.

When discussing a wall shear stress in the various embodiments herein, it should be understood that cerebrospinal fluid flows through the catheters only when the associated valve is opened. Further, the valve may open and close many times during a single day. Accordingly, the catheters will go through periods of minimal or zero flow through the catheters, a transient period of flow during valve opening where larger wall shear stresses may be present, and steady-state periods of flow during open-valve conditions. Therefore, while the wall shear stresses applied during a transient flow period may be greater than the noted threshold shear stresses, the wall shear stresses discussed herein are primarily intended to refer to the wall shear stresses during steady-state periods of open-valve conditions with the noted flow rates. Therefore, the wall shear stresses within the holes and internal lumen of the various embodiments of catheters disclosed herein may be greater than a threshold shear stress during transient flow periods and/or during stead-state flow periods.

Unlike typical ventricular catheters where the wall shear stress during operation is not considered, it may be desirable for the wall shear stress along the length of a catheter within the various holes and internal lumen to be more uniform to provide a more uniform performance with regards to tissue adhesion and growth within the catheter. In one such embodiment, a ratio of a maximum wall shear stress along a length of the catheter relative to a minimum wall shear stress along a length of the catheter under a predetermined flow of a fluid, such as cerebrospinal fluid, may be used to quantify the uniformity of the applied wall shear stresses. Depending on the particular application, the ratio of the maximum wall shear stress in the catheter to the minimum wall shear stress in the catheter may correspond to any appropriate range of ratios. For example, in some embodiments, a ventricular catheter may exhibit a ratio of a maximum wall shear stress in the catheter to the minimum wall shear stress in the catheter under a predetermined flow that is greater than or equal to 1, 2, 3, and/or any other appropriate ratio. Correspondingly, the ratio of the maximum wall shear stress in the catheter to the minimum wall shear stress in the catheter under a predetermined flow may be less than or equal to 10, 9, 7, 5, and/or any other appropriate ratio. Combinations of the foregoing are contemplated including, a ratio of a maximum and minimum wall shear stress within a ventricular catheter for a predetermined flow through the catheter that is between or equal to 1 and 10, 3 and 9, and/or any other appropriate combination. However, it should be understood that ratios both greater than and less than those noted above may also be used in certain embodiments as the disclosure is not limited in this fashion.

Depending on the particular application, a hole depth may correspond to any appropriate range of hole depths. For example, in some embodiments, depth of the plurality of holes may be greater than or equal to 0.4 mm, 0.5 mm, 0.6 mm, and/or any other appropriate hole depth. Correspondingly, the hole depths may be less than or equal to 1.0 mm, 0.9 mm, 0.8 mm, 0.7 mm, 0.6 mm, and/or any other appropriate hole depth. Combinations of the foregoing are contemplated including hole depths that are between or equal to 0.4 mm and 1.0 mm, 0.5 mm and 0.6 mm, and/or any other appropriate combination of the foregoing. However, it should be understood that hole depths both greater than and less than those noted above may also be used in certain embodiments as the disclosure is not limited in this manner.

Depending on the particular application, a hole transverse dimension may correspond to any appropriate range of hole transverse dimensions which may be balanced with hole depth to provide a desired wall shear stress under a given predetermined flow rate. For example, in some embodiments, a hole transverse dimension may be greater than or equal to 0.8 mm, 0.9 mm, 1.0 mm, and/or any other appropriate hole transverse dimension. Correspondingly, the hole transverse dimension may be less than or equal to 1.3 mm, 1.2 mm, 1.1 mm, 1.0 mm, and/or any other appropriate hole transverse dimension. Combinations of the foregoing are contemplated including, a hole transverse dimension that is between or equal to 0.8 mm and 1.3 mm, 1.0 mm and 1.2 mm, and/or any other appropriate combination of the foregoing. Again, it should be understood that hole transverse dimensions both greater than and less than those noted above may also be used in certain embodiments as the disclosure is not so limited.

Depending on the particular application, a transverse dimension of an internal lumen of a ventricular catheter may correspond to any appropriate range of transverse dimensions of an internal lumen to provide desired wall shear stresses within the lumen when balanced with other design parameters of a catheter. Additionally, depending on the particular embodiment, the transverse dimension of the internal lumen may vary along a length of the catheter to provide a desired wall shear stress along a length of the catheter, or the transverse dimension of the internal lumen may be substantially constant along the length catheter as the disclosure is not limited in this manner. In either case, a transverse dimension of an internal lumen of a ventricular catheter may be greater than or equal to 0.8 mm, 1.0 mm, 1.2 mm, and/or any other appropriate transverse dimension. Correspondingly, the transverse dimension of an internal lumen may be less than or equal to 1.5 mm, 1.4 mm, 1.3 mm, and/or any other appropriate transverse dimension. Combinations of the foregoing are contemplated including, a transverse dimension of an internal lumen that is between or equal to 0.8 mm and 1.5 mm, 1.1 mm and 1.4 mm, and/or any other appropriate combination of the foregoing. However, it should be understood that transverse dimensions of an internal lumen both greater than and less than those noted above may also be used as the disclosure is not limited in this fashion.

In addition to the above, in some embodiments, a transverse dimension of an exterior surface of a ventricular catheter may correspond to any appropriate range of dimensions. For example, the transverse dimension of the exterior surface of a catheter may either vary along a length of the catheter and/or may be substantially constant along a length of the catheter. In either case, depending on the particular embodiment, the transverse dimension of the exterior surface of the catheter may be greater than or equal to 2.0 mm, 2.3 mm, 2.5 mm, and/or any other appropriate dimension. Correspondingly, the transverse dimension of the exterior surface of catheter may be less than or equal to 3 mm, 2.5 mm, 2.3 mm, and/or any other appropriate dimension. Combinations of the foregoing are contemplated, including, for example, a transverse dimension of an exterior surface of a catheter that is between or equal to 2 mm and 3 mm. Of course, embodiments in which catheters having exterior surfaces with transverse dimensions both greater than and less than those noted above are also contemplated as the disclosure is not limited in this manner.

Any appropriate spacing between adjacent holes along a length of a catheter may be used to provide a desired flow rate and/or uniformity of flow through a ventricular catheter during use. That said, in some embodiments, spacing between adjacent holes along a length of the catheter may be greater than or equal to 1 mm, 2 mm, 3 mm, and/or any other appropriate spacing between holes. Correspondingly, the spacing between adjacent holes along a length of a catheter may be less than or equal to 5 mm, 4 mm, 3 mm, 2 mm, and/or any other appropriate spacing. Combinations of the foregoing ranges are contemplated including, a spacing between adjacent holes that is between or equal to 1 mm and 5 mm. Again, it should be understood that spacing between holes both greater than and less than those noted above may also be used in certain embodiments. Further, depending on the particular application, a uniform spacing or non-uniform spacing between holes along a length of catheter may be used as the disclosure is not so limited.

As should be appreciated, the flowrate through a ventricular catheter during use may vary depending on the particular application. For example, in some embodiments, a ventricular catheter may be used on a pediatric patient, where a lower average flowrate of cerebrospinal fluid through the catheter would be expected as compared to a ventricular catheter implanted in an adult patient. Regardless, in some embodiments, an average predetermined flowrate during use with an implanted ventricular catheter may be assumed to be approximately 10%, or other appropriate percentage, of cerebrospinal fluid production rate of a subject to provide a minimum expected flow rate, through the catheter, and thus, minimum corresponding shear stresses, during use. The average production rate of cerebrospinal fluid in an adult is about 0.3 mL/min. Thus, in one such embodiment, an average predetermined flow rate used to design the systems disclosed herein may be greater than or equal to 0.01 mL/min, 0.02 mL/min, and/or any other appropriate flow rate. Correspondingly, the average predetermined flow rate during use may be less or equal to 0.04 mL/min, 0.03 mL/min, and/or any other appropriate flow rate. Combinations of the foregoing are contemplated including, an average predetermined flow rate that is between or equal to 0.01 mL/min and 0.04 mL/min. In some instance, the average predetermined flow rate used with the various embodiments disclosed herein may be about 0.03 mL/min. Again, depending on the particular application, it should be understood that flow rates both greater than and less than those noted above may also be used in certain embodiments in which a minimum threshold shear stress is provided under those flow rates as the disclosure is not limited in this fashion.

As used herein, a transverse dimension may refer to a dimension that is perpendicular to a longitudinal axial direction of a particular feature. For example, a transverse dimension of a circular lumen and/or hole may refer to a diameter of the hole or lumen. Of course, in instances where non-circular features are used, the transverse dimension may refer to other dimensions such as a width of an ovular, square, or rectangular lumen or hole.

It should be understood that the wall shear stresses applied to the inner surfaces of the holes and internal lumen of the catheters disclosed herein may be determined in any number of ways. For example, computational fluid dynamics (CFD) simulations as described herein may be used to determine the wall shear stresses applied to the holes and internal lumen of a catheter. Alternatively, or in addition to CFD, various experimental methods may be used to evaluate the fluid flow through a catheter which may then be used to calculate the wall shear stress using any appropriate method. For example, a flow profile in one or more portions of a catheter may be measured using Particle Tracking Velocimetry (PTV). The wall shear stress profile may then be calculated from the velocity slope at the wall, which may be available from the experimentally obtained flow profile.

Many of the embodiments described herein are described relative to a ventricular catheter. However, it should be understood that all of the various embodiments, dimensional ranges, constructions, materials, and other disclosed concepts are applicable to catheters that are not placed directly in the ventricular space. For example, the embodiments disclosed herein may be used as catheters placed in fluid communication with the cerebrospinal fluid space of a subject in any appropriate manner. Therefore, the various disclosed embodiments and modifications may be applied to any catheter including, for example, catheters placed in the ventricular space, the cisternal spaces, the lumbar subarachnoid space, and/or any other appropriate space of a subject that is in fluid communication with the cerebrospinal fluid of the subject.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

As best shown in FIG. 1, a catheter based shunting mechanisms for treating hydrocephalus includes three main components: a proximal ventricular catheter 2 including a proximal tip, a check valve 3 or other appropriate one-way valving arrangement that opens above a threshold pressure, and a distal catheter 4. When a patient's brain 1 contains excessive cerebrospinal fluid so as to cause the pressure within the brain to exceed a safe threshold, the check valve opens, allowing cerebrospinal fluid to flow into the embedded tip portion of the proximal ventricular catheter that is embedded in the brain and in fluid communication with the ventricular space of the brain. The cerebrospinal fluid then flows distally through the proximal ventricular catheter and the open check valve into a distal catheter 4 that carries the cerebrospinal fluid to a waste area 5, generally the abdominal cavity or the cardiovascular system, where the cerebrospinal fluid may then be reabsorbed into the body. Subsequently, when the pressure in the brain drops below a predetermined pressure threshold, the check valve closes, restricting flow through ventricular catheter.

Figure 2:
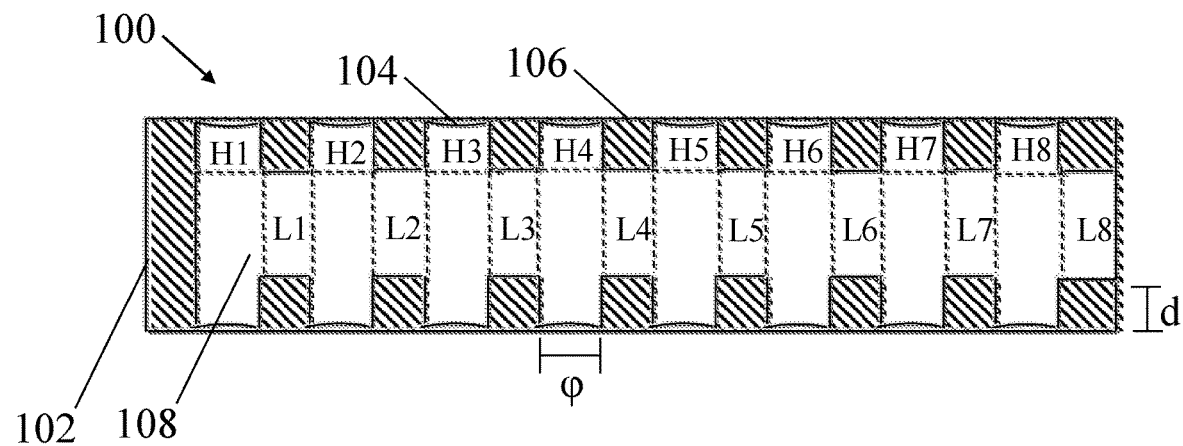
FIG. 2 is a schematic cross sectional view of a prior art ventricular catheter.

FIG. 2 depicts generic ventricular catheter that includes a tube 100 with a plurality of holes 104 therein that are disposed along a length of at least a tip portion of the catheter including a closed proximal end 102. The holes extend from an exterior surface 106 of the tube of the catheter to an internal lumen 108 of the tube that extends along an axial length of the catheter. The illustrated geometry of a typical ventricular catheter features holes H1-H8 arrayed along the part of a catheter inserted into the cerebrospinal fluid space and a corresponding plurality of lumen segments L1-L8 disposed along a length of the catheter. As noted above, in typical ventricular catheters, holes H1-H8 may have a transverse dimension, such as a diameter, that is either the same or different along a length of the catheter. For example, the hole transverse dimension $\varphi$ may vary among the holes or the transverse dimension $\varphi$ may remain constant between the holes. As shown in the figure, the hole depth d is constant for all of the holes along a length of the catheter. As described above, catheters that use this type of design often fail due to obstruction by tissue over time despite the use of various design features, including uniform flow rates, flanged or J-shaped tips, and recessed holes formed in the catheter, to name a few.

Figure 3:
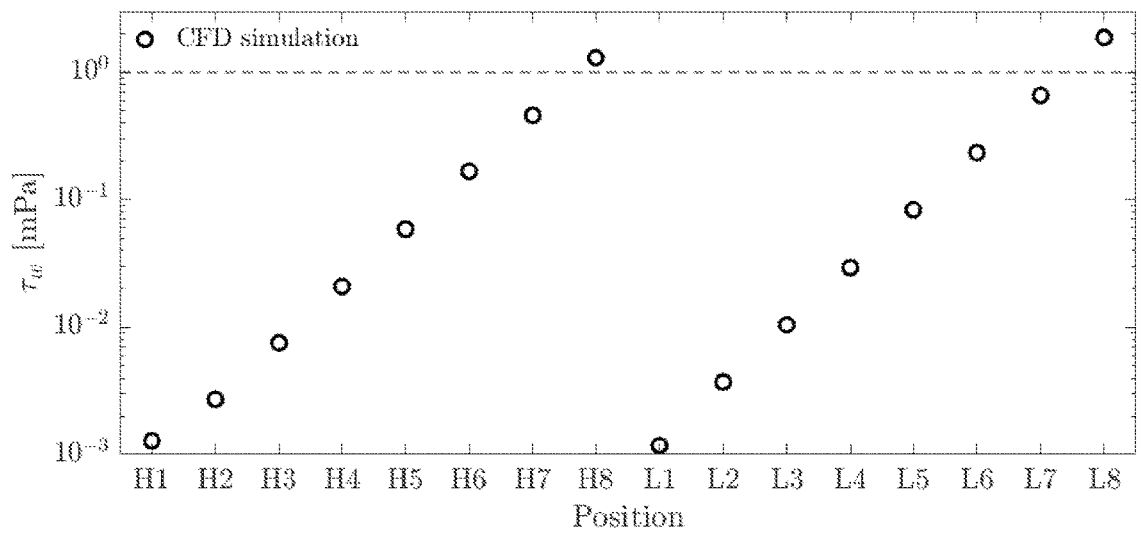
FIG. 3 is a graph showing the variation in wall shear stress along the ventricular catheter of FIG. 2.

FIG. 3 shows an exemplary wall shear stress distribution of a generic catheter with constant hole depth d and constant hole transverse dimension (i.e. diameter) $\varphi$, similar to that depicted in FIG. 2. As elaborated on in the examples, computational fluid dynamic (CFD) simulations were used to determine the wall shear stresses in various regions of the catheter for a total flow rate that is about 10% of the cerebrospinal fluid production rate for an adult, roughly 0.03 mL/min. As can be seen in FIG. 3, the distribution of wall shear stress exhibits an exponential decay towards a proximal tip of the catheter, showing a decrease of three orders of magnitude from more than 1 mPa to about $10^{-3}$ mPa. An applied wall shear stress of about 1 mPa may inhibit the growth of astrocytes. However, as shown in FIG. 3, every compartment except hole 8 (H8) and lumen portion 8 (L8) fails to exhibit sufficient wall shear stress to inhibit the formation of astrocyte obstructions. Accordingly, it is clear that the generic geometry of a typical ventricular catheter is unable to adequately prevent the adhesion and growth of brain tissues, such as astrocytes, in the catheter.

Figure 4:
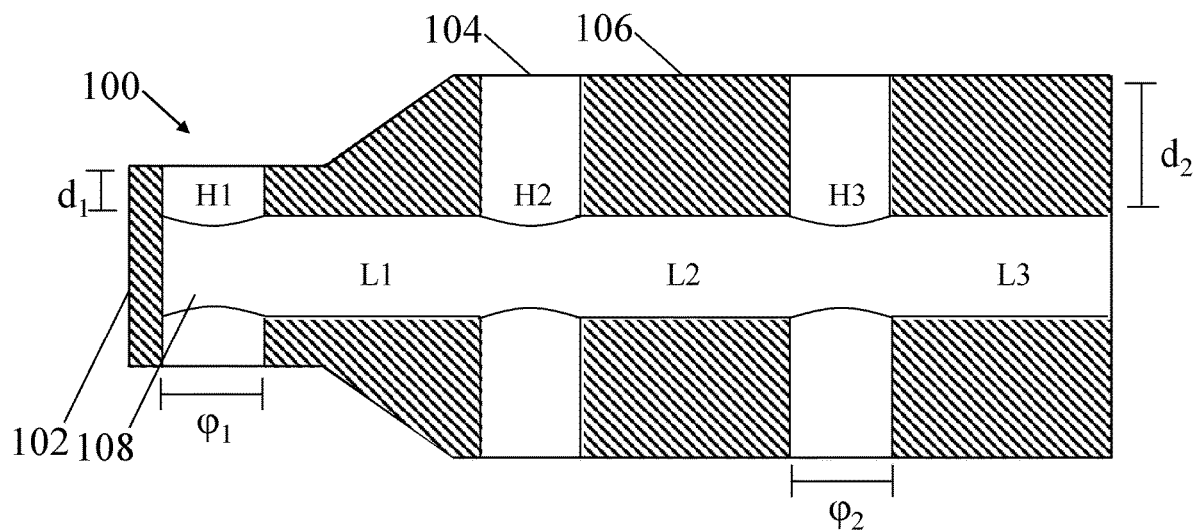
FIG. 4 is a schematic cross sectional view of a ventricular catheter according to one embodiment.

FIG. 4 depicts an exemplary embodiment of a ventricular catheter that has been constructed to provide a desired minimum wall shear stress within the holes and internal lumen during use. Similar to the above, the ventricular catheter includes a tube 100 with a plurality of holes 104 disposed along a length of the tube in at least a proximally located tip portion of the catheter. The tube includes a closed proximal end 102. The holes extend from an exterior surface 106 of the tube to an internal lumen 108 of the catheter that extends along an axial length of the catheter. In this specific embodiment, holes H1-H3 are disposed along a length of a catheter tip inserted into a space that is in fluid communication with the cerebrospinal fluid. The catheter also includes a plurality of lumen segments L1-L3. In some embodiments, the first hole H1 may have a first transverse dimension $\varphi_1$ and a first depth $d_1$. One or more holes, such as the second and third holes H2 and H3 may have a second transverse dimension $\varphi_2$ and depth $d_2$, though instances where multiple different transverse dimensions and depths are used for these holes are also contemplated. As shown in the figure, the first depth of the first hole is different from a depth of at least one of the other holes. For example, a depth of the holes may vary sequentially along a length of the catheter. Separately, the transverse dimensions of each hole may be selected in combination with the hole depth, hole space, and transverse dimension of the lumen such that the resulting wall shear stress at each hole H1-H3 is above a desired threshold. Further, the transverse dimension of each section of the lumen may also be selected in conjunction with these parameters, i.e. lumen segments L1-L3, such that a wall shear stress within each portion of the lumen remains greater the wall shear stress threshold during normal operation with a predetermined flow rate of cerebrospinal fluid through the catheter. In some embodiments, a transverse dimension of the holes may be the same, while in other embodiments, the holes may have different transverse dimensions.

Figure 5:
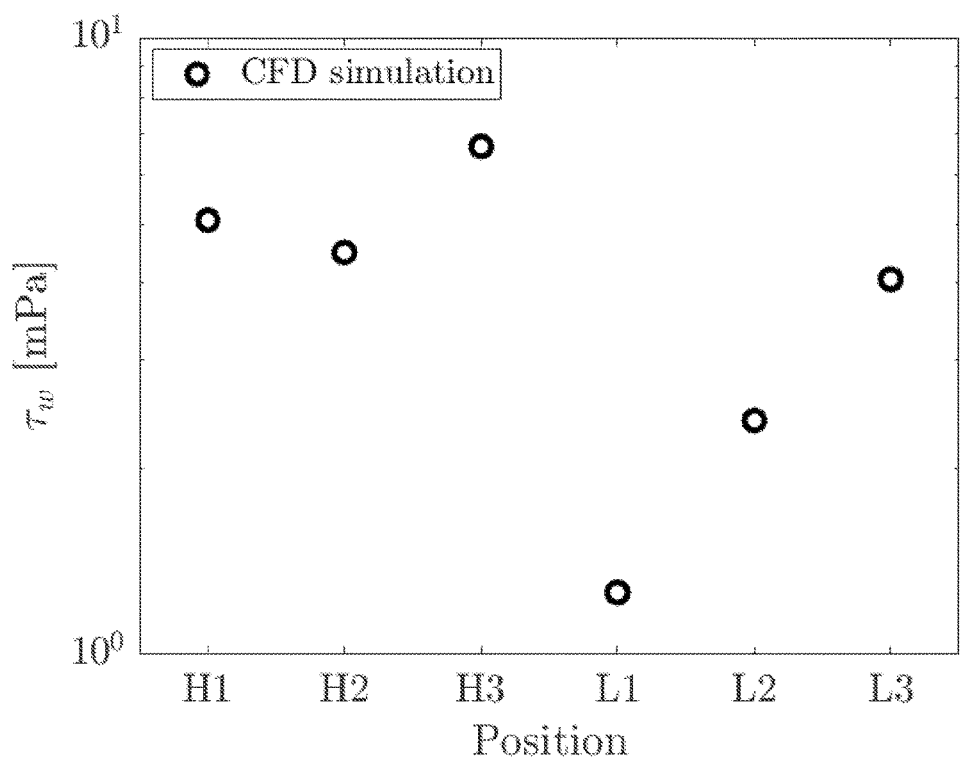
FIG. 5 is a graph showing the variation in wall shear stress along the ventricular catheter shown in FIG. 4.

Similar to the above, FIG. 5 presents a graph of wall shear stress distribution at different locations within the ventricular catheter depicted in FIG. 4 determined using a CFD simulation. As elaborated on in the examples, FIG. 5 illustrates how the distribution of wall shear stress in the holes and internal lumen of the catheter varied by no more than a factor of roughly 10 along a length of a catheter with a design optimized for wall shear stresses. Further, each hole H1-H3 and section of the internal lumen L1-L3 exhibited wall shear stresses greater than 1 mPa which may be sufficient to at least reduce, and likely substantially inhibit, astrocyte, and other brain tissue obstruction of the catheter.

Figure 6:
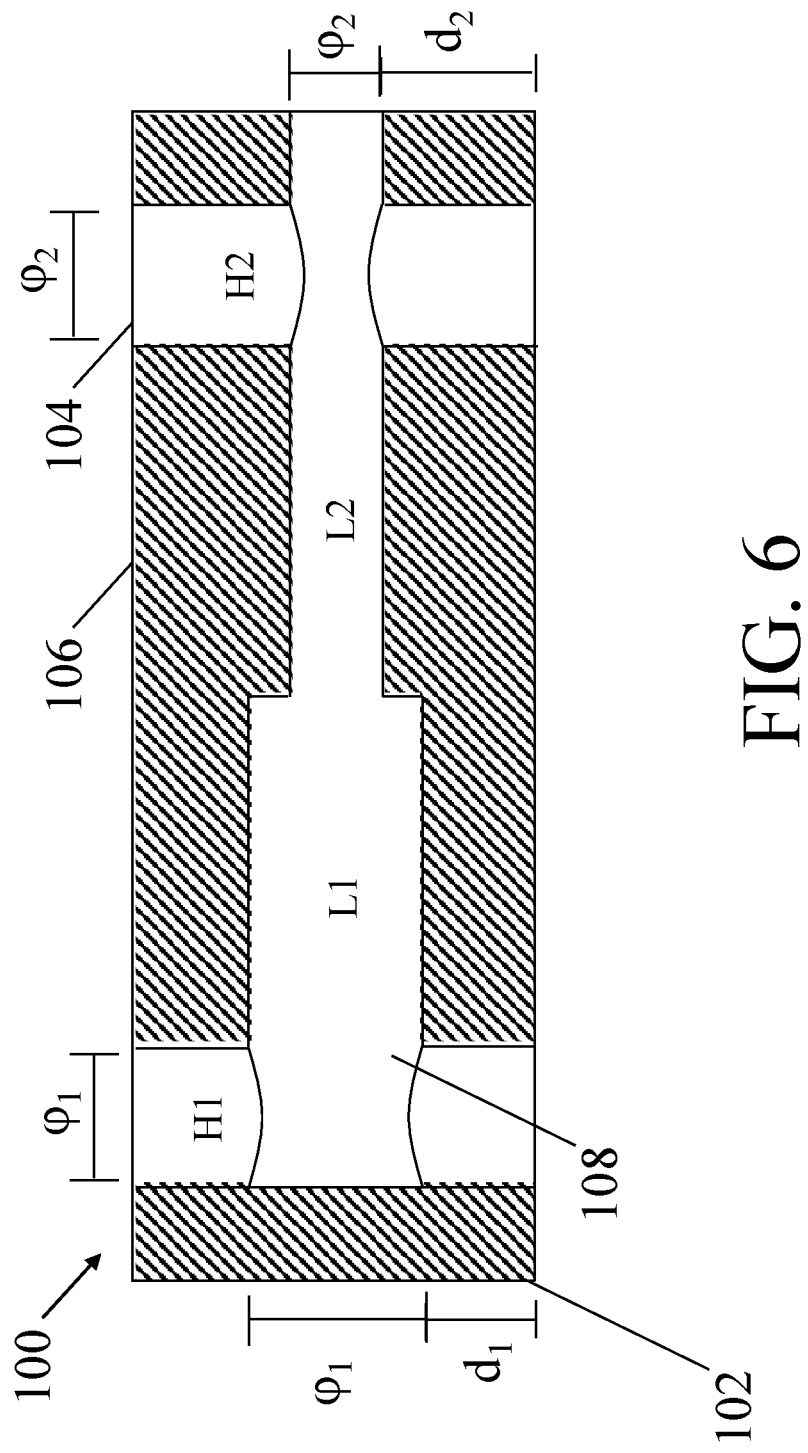
FIG. 6 is a schematic cross sectional view of another ventricular catheter according to one embodiment.

FIG. 6 depicts another exemplary embodiment of a ventricular catheter. The catheter again includes a tube 100 with a closed proximal end 102 and a plurality of holes 104 disposed along a length of the catheter. The holes extend from an exterior surface 106 of the tube to an internal lumen 108 of the catheter. In the embodiment of FIG. 4, the depths $d_1$ and $d_2$ of the holes H1 and H2/H3 are changed by changing an external diameter of the catheter tube relative to a constant diameter lumen. In contrast, in FIG. 6, the depths $d_1$ and $d_2$ of the two holes H1 and H2 shown in the figures are controlled by altering the transverse dimension of the internal lumen. Specifically, the transverse dimension $\varphi_1$ of the proximal lumen segment L1 is different than the transverse dimension $\varphi_2$ of the next distally located lumen segment L2 to provide the desired change in hole depths in different portions of the catheter In the above embodiments, the depth of a hole is controlled by either controlling an exterior transverse dimension of a tube of a catheter relative to the size of an internal lumen with a constant transverse dimension or controlling the transverse dimension of an internal lumen relative to a constant exterior transverse dimension of the two. However, it should be understood that embodiments in which the depth of one or more holes is controlled using combinations of variations in an internal lumen dimension and/or a dimension of an exterior of a tube are also contemplated as the disclosure is not limited to how the depth of the disclosed holes is controlled.

Example: Wall Shear Stress Versus Cell Confluency

Microfluidic channels were used to investigate the effect of fluid shear stress on astrocytes. Specifically, the change in confluency over three days was monitored. The microfluidic culture system employed a commercial microfluidic channel (μ-Slide I Luer, ibidi GMBH). The cross-section of this channel had a high aspect ratio of 25, allowing a nearly uniform wall shear stress on the bottom surface where cells were cultured. The bottom surface was chemically treated (ibiTreat) to enhance cell attachment, and the polyethylene-based bottom plate (#1.5 ibidi Polymer Coverslip) was permeable to oxygen and carbon dioxide.

A cell line of mouse astrocytes (C8-D1A, ATCC) were used in all experiments. Astrocytes were maintained in DMEM (D6429, Sigma), supplemented with 10% FBS (FBS001, Neuromics), 1% Penicillin-Streptomycin (15140122, Gibco), and 2.5 U/mL nystatin (N6261, Sigma) at 37° C. in a humidified atmosphere of 10% $CO_2$. Fresh equilibrated medium was stored in a $CO_2$ incubator, and the medium was injected into the channel by a syringe pump (PHD ULTRA, Harvard Apparatus), achieving a constant flow rate. The wall shear stress on the channel surface was set to 3 mPa by adjusting the flow rate to 6 μL/min.

Without wishing to be bound by theory, confluency is the proportion of surface area occupied by cells in the adherent cell culture. The confluency in an area with uniform wall shear stress using the system and method described above was monitored daily with phase contrast microscopy for three days.

Using the above testing methodology, it was observed that wall shear stresses of about 3 mPa prevented astrocytes from increasing confluency and maintaining their healthy morphology. Thus, applying wall shear stresses to the internal surfaces of a catheter during use may at least reduce, or substantially prevent, the adhesion and growth of brain cells, such as astrocytes, within a ventricular catheter during use.

Example: Mathematical Models Describing Flow in Ventricular Catheters

The cerebrospinal fluid flow in ventricular catheters can be regarded as a laminar flow. In a steady state where the total flow rate is constant, the conventional ventricular catheter shows an exponential increase of flow rates along the array of holes, having the largest flow rate at the proximal hole, which is the hole closest to the downstream.

A lumped-element model (LEM) can estimate the distribution of flow rates and wall shear stress along holes and lumen segments. The model formulates a ventricular catheter as a multiple-pipe system which has multiple inlet pipes (i.e. holes) whose flow converges into a main pipe (i.e. the lumen). Given that the flow is laminar, Poiseuille (pressure induced) flow can be assumed in every pipe.

$$\tau_k^{\mathcal{H}} = \frac{G_k}{md^3 \sum_{i=1}^{n} G_i} \tau_o$$

According to the LEM, $\tau_k^{\mathcal{H}}$, the wall shear stress at the $k^{th}$ hole segment that is counted from the tip, is given by the above equation.

$$\tau_k^{\mathcal{L}} = \frac{\sum_{i=1}^{k} G_i}{\sum_{i=1}^{n} G_i} \tau_o$$

According to the LEM, $\tau_k^{\mathcal{L}}$, the wall shear stress at the $k^{th}$ lumen segment that is counted from the tip, is given by the above equation.

Example: Typical Ventricular Catheter Geometry

A conventional catheter design including several holes with constant depth similar to that shown in FIG. 2 was evaluated using computational fluid dynamics. Hole or lumen diameters in the catheter were varied from 0.5 to 1.5 mm with a hole spacing ranging from 1 to 3 mm. For modeling purposes, the flow rate was set to 0.03 mL/min, representing 10% of the typical cerebrospinal fluid production rate in the cerebral ventricular system. This flow rate represents a physiological lower bound of the shunt flow rate, which induces wall shear stress inside a catheter as low as possible. In simulations, the viscosity of the cerebrospinal fluid was assumed to be 0.8 mPa s. As noted above, the inventors observed from the astrocyte experiment that fluid shear stress of 1 mPa prevented astrocytes from increasing confluency and maintaining a healthy morphology. Thus, when applying 1 mPa as a cutoff wall shear stress to the simulation result, all holes and lumens except H8 and L8 failed to meet the threshold condition. This implies a generic ventricular catheter may not have sufficient wall shear stress across the inner surfaces of the holes and lumen.

According to the formulae above, and as shown in FIG. 3, the generic ventricular catheter exhibits a wide range of wall shear stress. Specifically, the modeled generic ventricular catheter exhibited wall shear stresses between just above 0.001 mPa at H1/L1 to just above 1 mPa at H8/L8. Accordingly, the ratio of the maximum wall shear stress to the minimum wall shear stress may be roughly on the order of 1000 for a generic ventricular catheter. As previously noted, to prevent obstructions in the ventricular catheter, it may be desirable to maintain the wall shear stresses within the holes and lumen of a catheter above a threshold of roughly 1 mPa. However, at each point along the generic ventricular catheter, the wall shear stress remained below 1 mPa except at H8/L8. Accordingly, the generic ventricular catheter may be susceptible to obstructions along any point along its length between H1/L1 and H7/L7.

Example: Optimizing Ventricular Catheter Geometry

Using CFD simulations, the hole and internal lumen dimensions were optimized using dimensionless ratios between hole transverse dimension (i.e. diameter) and lumen transverse dimension (i.e. diameter), and between hole depth and hole spacing. Using simulations, the inventors observed that as the ratio between hole transverse dimension (i.e. diameter) and lumen transverse dimension (i.e. diameter) decreased, wall shear stress increased. For example, decreasing the ratio between hole transverse dimension (i.e. diameter) and lumen transverse dimension (i.e. diameter) from 0.77 to 0.46 resulted in a significant increase in wall shear stress. In some simulations, the wall shear stress increased from roughly 0.0005 mPa at H1 to roughly 1.1 mPa at H1. The inventors further observed that as the ratio between hole depth and hole spacing increased, the wall shear stress increases. For example, as the ratio between hole depth and hole spacing increased from 0.3 to 0.6 the wall shear stress increased along all sections of the catheter.

In some simulations, the wall shear stress increased from roughly 0.0005 mPa to 0.001 mPa at H1 using this parameter alone.

Performing both optimizations in tandem resulted in a wall shear stress greater than 1 mPa along the full length of the catheter. According to the formulae above, and as shown in FIG. 5, the optimized ventricular catheter exhibited a smaller range of wall sheer stresses ranging from just greater than 1 mPa at L1 to just less than 10 mPa at H1. Accordingly, the ratio of the maximum, wall shear stress to the minimum wall shear stress was approximately 10. Moreover, the wall shear stress in the optimized ventricular catheter remained above the threshold of 1 mPa along the entire length of the catheter. Accordingly, brain cells, such as astrocytes are less likely to obstruct the catheter.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A catheter comprising:
   a tube; and
   a plurality of holes disposed along a length of the tube and extending from an exterior surface to an internal lumen of the tube, wherein the plurality of holes and the internal lumen of the tube are configured such that a wall shear stress of the plurality of holes and the internal lumen due to cerebrospinal fluid flowing through the catheter with a predetermined flow rate is greater than a threshold shear stress to prevent cell adhesion and growth within the catheter.

2. The catheter of claim 1, wherein each hole has a hole transverse dimension and a depth, wherein at least one hole of the plurality of holes has a first depth that is different from a second depth of at least one of the remaining plurality of holes.

3. The catheter of claim 2, wherein the hole transverse dimension and depth of each hole are configured such that the wall shear stress within each hole is greater than the threshold under the predetermined flow rate through the catheter.

4. The catheter of claim 2, wherein the depth of each of the plurality of holes changes sequentially along an axial length of the catheter.

5. The catheter of claim 1, wherein an outer transverse dimension of the tube is different at locations associated with holes of the plurality of holes with different depths.

6. The catheter of claim 1, wherein an inner transverse dimension of the internal lumen is different at locations associated with holes of the plurality of holes with different depths.

7. The catheter of claim 1, wherein the plurality of holes are configured to provide a substantially uniform flow through adjacent holes.

8. The catheter of claim 1, wherein the predetermined flow rate is between or equal to 0.01 mL/min and 0.04 mL/min.

9. The catheter of claim 1, wherein the threshold shear stress is between or equal to 1 mPa and 10 mPa.

10. The catheter of claim 1, wherein a ratio of a minimum wall shear stress to a maximum wall shear stress of the catheter under the predetermined flow rate of cerebrospinal fluid is between or equal to 1 and 10.

11. A method for draining cerebrospinal fluid from a cerebrospinal fluid space of a brain of a subject comprising:
   inserting a catheter into a location fluidly connected to the cerebrospinal fluid space of the brain, wherein the catheter comprises a tube and a plurality of holes disposed along a length of the tube and extending from an exterior surface to an internal lumen of the tube; and
   draining the cerebrospinal fluid from the cerebrospinal fluid space through the catheter, wherein draining the cerebrospinal fluid through the catheter applies wall shear stresses to the plurality of holes and the internal lumen that is greater than a threshold shear stress to prevent cell adhesion and growth within the catheter.

12. The method of claim 11, wherein each hole has a hole transverse dimension and a hole depth, wherein at least one hole of the plurality of holes has a first depth that is different from a second depth of at least one of the remaining plurality of holes.

13. The method of claim 11, wherein a flow through adjacent holes of the plurality of holes is substantially uniform.

14. The method of claim 11, wherein a flowrate through the catheter is between or equal to 0.01 mL/min and 0.04 mL/min.

15. The method of claim 11, wherein the threshold shear stress is between or equal to 1 mPa and 10 mPa.

16. The method of claim 11, wherein a ratio of a minimum wall shear stress to a maximum wall shear stress of the catheter is between or equal to 1 and 10.

17. A catheter comprising:
   a tube including one or more cylindrical portions; and
   a plurality of holes disposed along a length of the tube and extending from an exterior surface to an internal lumen of the tube, each hole having a hole transverse dimension and a hole depth, wherein at least one hole of the plurality of holes has a first depth that is different from a second depth of at least one of the remaining plurality of holes wherein the plurality of holes are formed in the one or more cylindrical portions.

18. The catheter of claim 17, wherein the plurality of holes and the internal lumen are configured such that a wall shear stress of the plurality of holes and the internal lumen due to cerebrospinal flowing through the catheter with a predetermined flow rate is greater than a threshold shear stress to prevent cell adhesion and growth within the catheter.

19. The catheter of claim 18, wherein the predetermined flow rate is between or equal to 0.01 mL/min and 0.04 mL/min.

20. The catheter of claim 18, wherein the threshold shear stress is between or equal to 1 mPa and 10 mPa.

21. The catheter of claim 18, wherein a ratio of a minimum wall shear stress to a maximum wall shear stress of the catheter under the predetermined flow rate of cerebrospinal fluid is between or equal to 1 and 10.

22. The catheter of claim 17, wherein an outer transverse dimension of the catheter is different at locations associated with holes of the plurality of holes with different depths.

23. The catheter of claim 17, wherein the depths of the plurality of holes changes sequentially along an axial length of the tube.

24. The catheter of claim 17, wherein an inner transverse dimension of the internal lumen is different at locations associated with holes of the plurality of holes with different depths.

25. The catheter of claim 17, wherein the plurality of holes are configured to provide a substantially uniform flow through adjacent holes.

* * * * *